US008534989B2

(12) United States Patent
Groves et al.

(10) Patent No.: US 8,534,989 B2
(45) Date of Patent: Sep. 17, 2013

(54) MULTI-PIECE TURBOCHARGER BEARING

(75) Inventors: Chris Groves, Domèvre sur Durbion (FR); Mark Groskreutz, Morristown, NJ (US); Dominique Petitjean, Julienrupt (FR); Anthony Ruquart, Epinal (FR); Philippe Arnold, Hennecourt (FR); Guillaume Dupont, Thaon les Vosges (FR); Baptiste Szczyrba, Nancy (FR); Celine Szczyrba, legal representative, Nancy (FR)

(73) Assignee: Honeywell International Inc., Morristown, NJ (US)

( * ) Notice: Subject to any disclaimer, the term of this patent is extended or adjusted under 35 U.S.C. 154(b) by 784 days.

(21) Appl. No.: 12/689,895

(22) Filed: Jan. 19, 2010
(Under 37 CFR 1.47)

(65) Prior Publication Data
US 2011/0176907 A1 Jul. 21, 2011

(51) Int. Cl.
*F04D 29/056* (2006.01)
(52) U.S. Cl.
USPC .......................................... 415/111; 415/229
(58) Field of Classification Search
USPC .................. 415/110, 111, 112, 229
See application file for complete search history.

(56) References Cited

U.S. PATENT DOCUMENTS

| 3,993,370 A | 11/1976 | Woollenweber |
| 4,902,144 A | 2/1990 | Thoren |
| 5,562,349 A | 10/1996 | Nespodzany, Jr. et al. |
| 6,017,184 A * | 1/2000 | Aguilar et al. ................ 415/112 |
| 7,189,005 B2 | 3/2007 | Ward |

FOREIGN PATENT DOCUMENTS

DE 10238415 3/2004

* cited by examiner

*Primary Examiner* — Richard Edgar
(74) *Attorney, Agent, or Firm* — Brian J. Pangrle

(57) ABSTRACT

An exemplary multi-piece bearing for a turbocharger includes a cylindrical piece that has a coefficient of thermal expansion, opposing ends and an outer surface and an inner surface that extend between the opposing ends where the outer surface includes one or more lubricant openings; an end piece that has a different coefficient of thermal expansion and a face where the face includes one or more lubricant openings; and lubricant passages formed by the cylindrical piece and the end piece for passage of lubricant between the one or more lubricant openings of the outer surface of the cylindrical piece and the one or more lubricant openings of the face of the end piece. As described herein, such an exemplary multi-piece bearing can, upon selection of coefficients of thermal expansion, help maintain axial clearances between various components during operation of a turbocharger. Other exemplary bearings, arrangements and methods are also disclosed.

20 Claims, 14 Drawing Sheets

MULTI-PIECE TURBOCHARGER BEARING

TECHNICAL FIELD

Subject matter disclosed herein generally relates to turbochargers and particularly multi-piece bearings that can account for thermal expansion to help maintain axial clearances.

BACKGROUND

For most turbochargers, axial clearances between rotating assembly components affects lubricant flow requirements and performance. Such clearances change with respect to temperature, especially as a turbocharger cycles between ambient temperatures (e.g., "cold start" temperatures) and operating temperatures. As components of different materials expand and contract, clearance ratios change. For example, a brass bearing with a length of about 30 mm will expand more than a steel shaft section seated in the bearing. In such a scenario, clearances between the brass bearing and facing components are likely to decrease with increasing temperature. Where such clearances are required for adequate lubricant flow, such flow may be adversely affected as operating temperature increases. Where the lubricant aims to cool components of a rotating assembly, any decrease in flow is generally undesirable.

Various conventional bearings are unitary (e.g., machined plain brass bearings). Such unitary, machined bearings are associated with some significant limitations as to features. Various exemplary multi-piece bearings described herein can reduce clearance-related thermal expansion issues and more readily allow for features that can benefit turbocharger performance.

DESCRIPTION OF DRAWINGS

Non-limiting and non-exhaustive examples are described with reference to the following figures.

DETAILED DESCRIPTION

Figure 1:
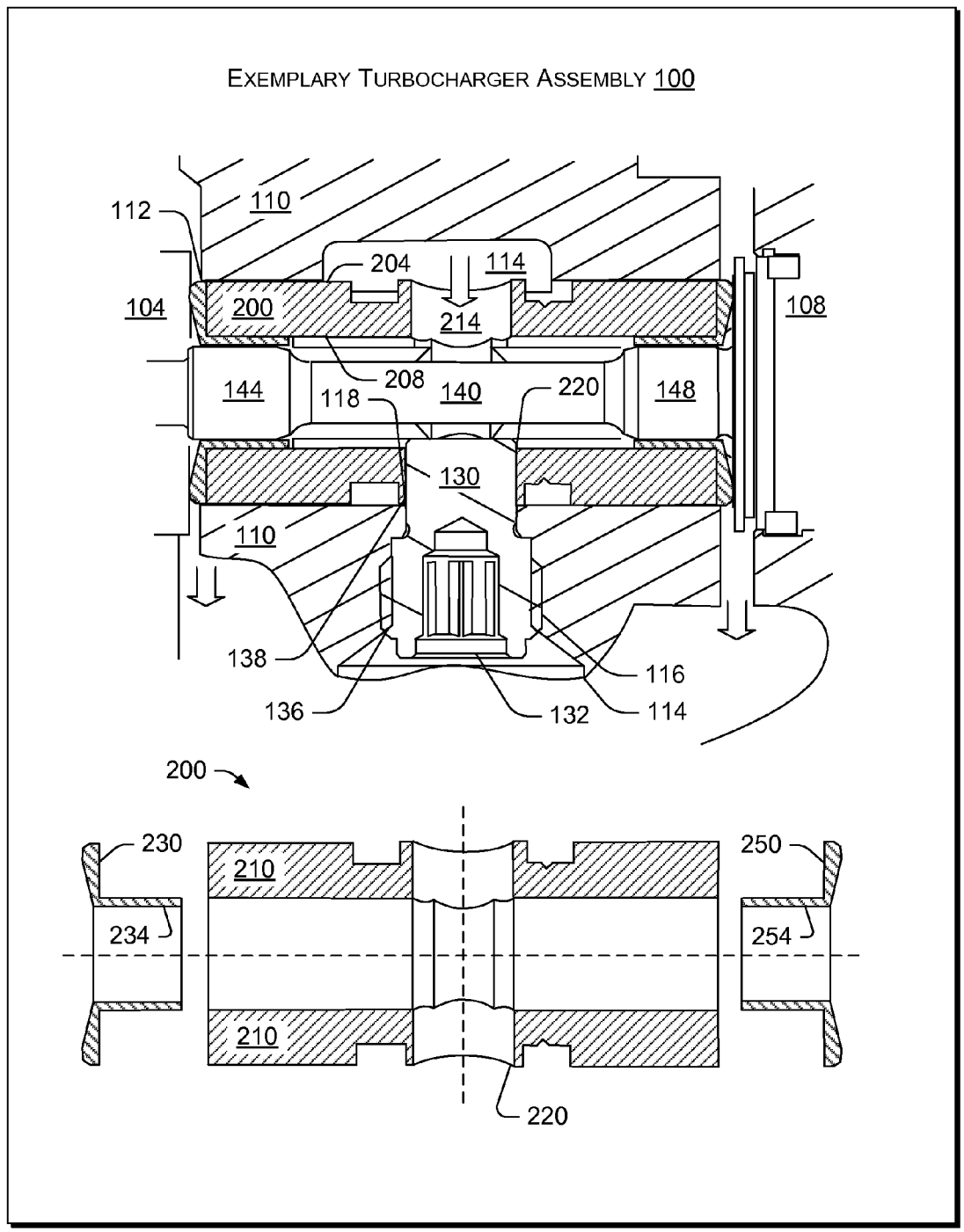
FIG. 1 is a diagram of a turbocharger assembly with an exemplary bearing.

As described herein, various exemplary multi-piece bearings include at least one end piece (or end cap) attached to a substantially cylindrical piece. For example, an exemplary bearing may include two brass end pieces attached to a cylindrical steel piece. In this example, the shape and placement of the end pieces can define one or more clearances associated with the bearing (e.g., radial and axial clearances). Further, where this exemplary bearing seats a steel shaft, the cylindrical steel piece will experience similar thermal expansion and contraction. Yet further, where lengths of the brass end pieces is small compared to the length of the cylindrical piece, changes in clearances may be primarily dictated by the steel shaft and the cylindrical piece. For example, where each of the brass end pieces includes a journal for the shaft, expansion of the intermediate cylindrical piece will largely dictate the axial distance between the two journals. In contrast, for a unitary brass bearing, and a given positive temperature differential, a steel shaft can be expected to expand less than the brass bearing, which can alter the positional relationship between the journals of the brass bearing and the steel shaft.

As described herein, various exemplary multi-piece bearings include lubricant flow paths defined, at least in part, by features of an end piece. Various bearings include end piece features and cylindrical piece features that cooperate to form lubricant flow paths. For example, a cylindrical piece can include openings along an outer surface configured to receive lubricant and passages associated with the openings to direct lubricant to an end piece. Various end pieces include passages where each passage extends axially between an inner opening and an outer face opening, for example, to provide lubricant to thrust surfaces of an end piece. Various multi-piece bearings also include lubricant passages to inner journal surfaces. As described herein, an inner journal surface may be associated with end piece or a cylindrical piece of a bearing.

In comparison to a conventional unitary (one-piece) bearing that relies on lubricant passing through an inner journal lubricant film before being supplied to an axial end thrust surface, an exemplary bearing can include one or more passages that supply lubricant to an axial end thrust surface without requiring the lubricant to pass through an inner journal lubricant film. For example, lubricant may be supplied from a lubricant squeeze film disposed between the bearing and a bore of a housing. Accordingly, when the exemplary bearing is compared to the conventional bearing, the lubricant supplied to the axial end thrust surface may be cooler, i.e., it is not heated by passage through the inner journal lubricant film. For the conventional bearing, heating typically reduces lubricant viscosity and thrust load capacity of the lubricated axial end thrust surface.

In various examples, lubricant is directed to an inner journal surface from a squeeze film. Lubricant may drain from the inner journal surface axially via channels in the inner journal surface, for example, to an inner chamber of the bearing that includes a drain hole (e.g., an aperture in a cylindrical piece disposed between two end pieces). In such an example, power lost by the shaft may be reduced in the inner chamber if the lubricant drains readily via the drain hole (or holes) (e.g., reduction in secondary lubricant shear or windage losses in the inner chamber shaft region). Further, the diameter of a shaft may be less than that of a compressor side journal surface and a turbine side journal surface of the shaft. A reduced shaft diameter along a portion disposed between a compressor side journal surface and a turbine side journal surface of the shaft acts to reduce angular velocity and surface area of that portion compared to the larger diameter compressor side journal surface and the turbine side journal surface.

As described herein, an exemplary multi-piece bearing that includes separate end components attached (e.g., brazed, press fit, etc.) to respective ends of an intermediate component allows thrust load capacity and power loss to be optimized, for example, by selecting features suited to a particular application of the bearing. In such an example, the intermediate component may be standardized and the bearing customized by selection of end components (e.g., selected based on size, features, material of construction, material treatment, etc.). In another example, an exemplary multi-piece bearing may have two components, a cylindrical component and an end component, which may be a compressor side end component or a turbine side end component. In this example, the cylindrical component may be configured with an integral turbine side end or an integral compressor side end. Accordingly, as described herein, an exemplary bearing includes at least one end piece, which may be a compressor side end piece or a turbine side end piece configured for attachment to a cylindrical piece.

As described herein, an exemplary end piece (or component) may be treated, for example, to enhance material strength of a thrust surface. One or more treatments, whether chemical, thermal or mechanical, may be used to enhance material strength or otherwise enhance performance of a thrust surface of an end piece.

As described herein, an exemplary bearing include sintered end pieces that are attached to respective ends of a cylindrical steel casing, for example, by brazing. In such an example, the end pieces optionally include inner journal surfaces that may be subject to treatment suitable for journal surfaces. For example, an exemplary end piece may be made by metallurgical powder sintering where an inner journal surface is treated using a chemical, thermal, mechanical treatment or a combination of one or more treatments.

As described herein, various exemplary multi-piece bearings allow for reduced variation in axial clearances with respect to temperature when compared to a conventional unitary brass bearing that seats a steel shaft. Various bearing may be manufactured with features that can reduce friction losses, reduce lubricant leakages and possibly enhance rotor stability when compared to a convention unitary bearing. An exemplary bearing may include brass end pieces fitted to respective ends of a cylindrical steel piece where the cylindrical steel piece exhibits thermal expansion and contraction equal to or approximately equal to that of a steel shaft seated in the bearing.

An exemplary end piece may be configured for attachment to a cylindrical piece (e.g., by press fit). As mentioned, lubricant passages or routes may be defined, in part, by features of an end piece, which may cooperate with features of a cylindrical piece. Such arrangements may provide lubricant passages that would otherwise be costly to machine into a unitary bearing. Attachment of one or more end pieces to a cylindrical piece may be performed to calibrate total bearing length (e.g., to determine axial clearances in a rotating assembly). By controlling axial clearances, an exemplary multi-piece bearing can provide opportunities for reducing lubricant leakage, especially at the outer diameter of the bearing (e.g., squeeze film leakage).

As described herein, an exemplary end piece may include an anti-rotation feature or features. Accordingly, an exemplary bearing may be located without requiring a separate anti-rotation pin (e.g., consider a locating mechanism that relies on a pin inserted into an aperture disposed between ends of a conventional bearing). Various exemplary bearings can include features that provide for axial damping of vibrations. By control of press fit tolerance, an exemplary bearing may provide trilobe profiles of internal journals, which can enhance rotor stability.

As mentioned, an exemplary bearing includes a cylindrical piece made of a material with the same or similar thermal coefficient of expansion as a shaft. In various examples, a cylindrical piece provides more than 70% and typically about 90% or more of the overall length of an exemplary bearing. As such, thermal expansion and contraction of an exemplary bearing is determined primarily by the cylindrical piece and less so by one or more end pieces. For example, where the quasi totality of the bearing length is made of steel, which has a similar thermal coefficient of expansion (~12 µm/m° C.) to the shaft, the bearing will have relatively constant axial clearances over a range of temperatures from ambient to operational (e.g., from about 20° C. to about 150° C.), especially when compared to a unitary brass bearing of equivalent length. Accordingly, ambient temperature (e.g., 20° C. or so-called "cold start" temperatures) operating axial clearances can be reduced compared to conventional unitary brass bearings. An exemplary bearing that includes a steel core and one or more end pieces may include manufacturing the steel core by high speed machining from a steel bar or other process (e.g., sintering or MIM process) with lesser accuracy requirements (e.g., where one or more end pieces determine clearances).

As described herein, an exemplary bearing includes end pieces that control both axial and radial shaft wheel clearances. Such end piece may be made of brass, may be stamped and may be attached via press fit to a cylindrical piece of a bearing.

Fine control of a press fit end piece can provide for a tri-lobe profile of a journal bearing, which is very good for stability under certain circumstances. As an assembly step, calibration may occur as to bearing length by appropriate positioning of one or more end pieces. Such an approach can enable "on CHRA" bearing assembly with both axial and radial bearing location, which may optionally alleviate use of a locating pin and reduce cost.

As described herein, various components of an exemplary multi-piece bearing can be sintered (e.g., brass, steel, etc.) with one or more features such as integral lubricant pockets, feed holes and complex pad geometry. An exemplary cylindrical component may be machining, sintered or otherwise manufactured. Various cooperative features may provide for separate lubricant feeds to an axial thrust surface and to inner journal surfaces for a shaft (e.g., to reduce pre-heating of lubricant to an axial thrust surface). Various exemplary assemblies may include a shaft with a slender portion intermediate a compressor side journal surface and a turbine side journal surface and drainage features that can reduce power loss from lubricant shear or windage. As described herein, exemplary thrust surfaces may be modular and optionally tailored to one or more particular applications (e.g., to optimize a bearing system in terms of load capacity or power loss or load capacity and power loss).

FIG. 1 shows an exemplary assembly 100 for a turbocharger (e.g., a turbocharger assembly). The assembly 100 has a compressor side 104 and a turbine side 108 with a center housing 110 disposed between these two sides. The housing 110 includes a substantially cylindrical surface 112 that defines a bore. The surface 112 is typically disposed at a substantially constant radius about a central axis (e.g., which coincides with a rotational axis of the turbocharger). The bore defining surface 112 meets another surface 114 that extends less than 360° around the central axis and includes a radius that exceeds the bore radius so as to define a lubricant well for the bore.

As shown in FIG. 1, an exemplary multi-piece bearing 200 is seated in the bore. The bearing 200 includes a cylindrical piece 210 disposed intermediate a compressor side end piece 230 and a turbine side end piece 250. The piece 210 of the bearing 200 has a substantially cylindrical wall defined largely by an outer surface 204 and an inner surface 208. The outer surface 204 is disposed at an outer radius about a central axis of the bearing 200 and the inner surface 208 is disposed at an inner radius about the central axis. The radius of the outer surface 204 is less than the radius of the bore surface 112 and greater than the radius of the inner surface 208.

The difference in the radii of the bore surface 112 and the outer surface 204 of the bearing define a lubricant film thickness that can help damp movement of the bearing 200 in the housing 110. An opening 214 in the wall of the bearing 200 allows lubricant to flow from the lubricant well defined by surface 114 to the inner surface 208 and correspondingly to a shaft bore defined by the inner surface 208. The assembly 100 of FIG. 1 may optionally include various lubricant paths, for example, as described with respect to the figures that follow.

In FIG. 1, a shaft 140 is shown positioned in the shaft bore of the bearing 200. The shaft 140 has a compressor side journal surface 144 and a turbine side journal surface 148. The surfaces 144 and 148 are typically disposed at a common radius about a rotational axis of the shaft 140. The common radius of the journal surfaces 144 and 148 is less than the inner radius of 208 of the center piece 210 of the bearing 200. In the example of FIG. 1, each of the end pieces 230, 250 includes, disposed at a radius, a journal surface 234, 254 that cooperates with one of the journal surfaces 144, 148, respectively. The difference in radii between each pair of surfaces defines a lubricant film thickness. The lubricant film lubricates the journal surfaces as the shaft 140 rotates in the bearing 200.

In the assembly 100 of FIG. 1, axial movement (e.g., translational movement) and rotational movement (or angular movement) of the bearing 200 are limited by varying degrees by a locating mechanism. In the example of FIG. 1, the locating mechanism relies on features of the housing 110, features of the bearing 200 and a locating pin 130. The housing 110 includes an opening 114 and threads 116 and a pilot surface 118. As shown, the center piece 210 of the bearing 200 includes an opening 220. The locating pin 130 includes a tool receptacle 132, threads 136 and a locating surface 138. These features of the housing 110, the bearing 200 and the pin 130 may be further defined by a securing region, a transition region, a locating region and an excess region, which may or may not exist depending on dimensions of the various features. The housing 110 and the pin 130 include the securing region and the transition region while the bearing 200 and the pin 130 include the locating region.

Upon insertion of the pin 130 into the opening 114 of the housing 110, the locating surface 138 of the pin 130 is preferably aligned with the opening 220 of the bearing 200 to axially locate the bearing 200 in the bore of the housing 110 and to allow some rotation of the bearing 200 about its axis. A tool may be positioned in the tool receptacle 132 of the pin 130 to rotate the pin 130 about a rotational axis. Accordingly, in the securing region, the threads 116 of the housing cooperate with the threads 136 of the locating pin 130 to secure the pin 130 in the housing 110.

As the turbocharger shaft 140 may rotate at speeds in excess of 100,000 RPM, various features of the assembly 100 must be accurately dimensioned. Specifically, radial clearances and axial clearances must be dimensioned for proper operation. Such clearances allow lubricant to flow in and around the bearing 200. As explained, as temperature increases, various components expand, which can alter clearances. As described herein, various exemplary bearings provide features that can help maintain clearances over a broad temperature range (e.g., from ambient temperature to operational temperature).

Figure 2:
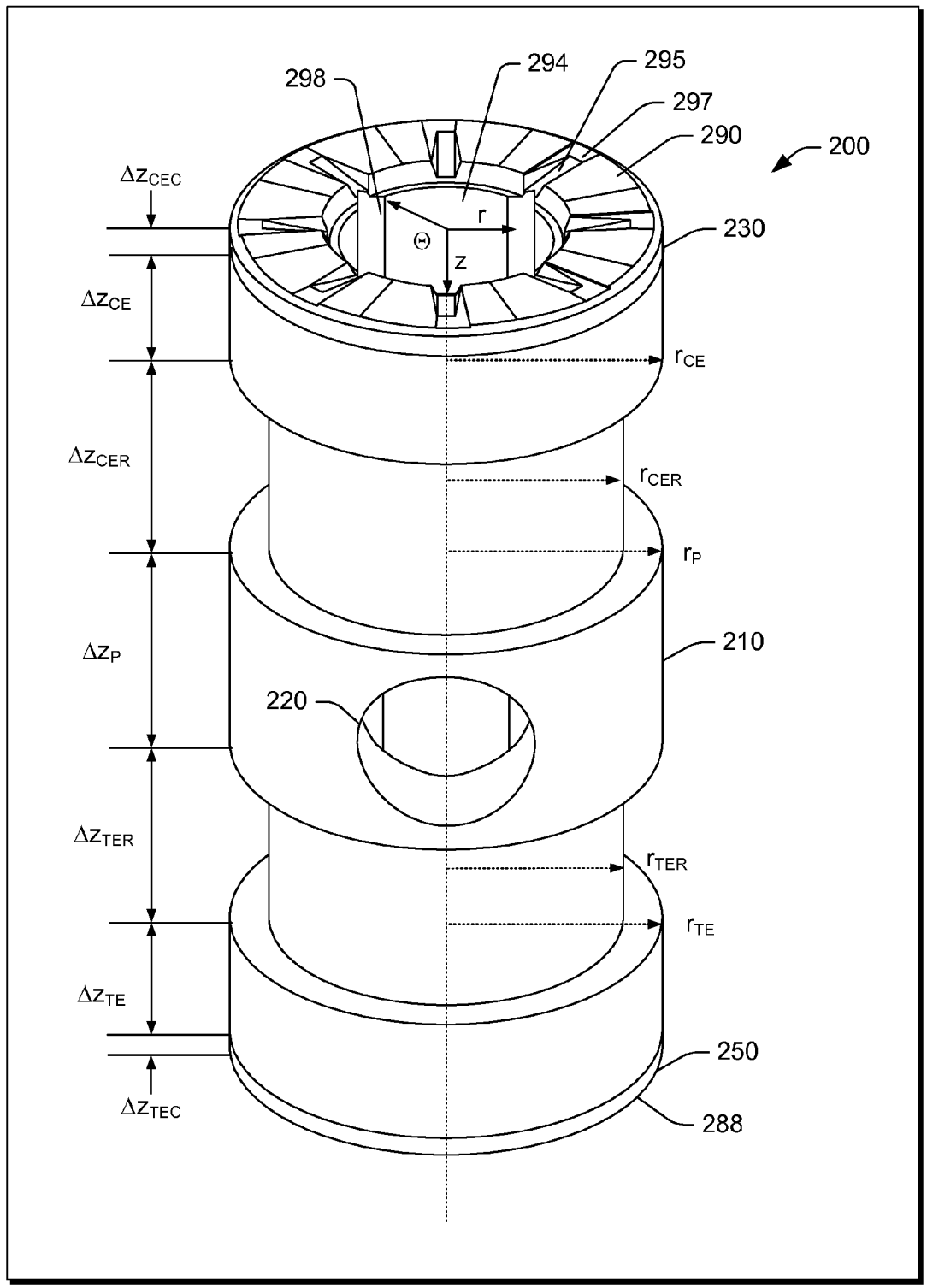
FIG. 2 is a perspective of the bearing of FIG. 1.

FIG. 2 shows a perspective view of the exemplary bearing 200 of FIG. 1 as including a compressor side end piece 230, a cylindrical piece 210 and a turbine side end piece 250. A cylindrical coordinate system $(r, \Theta, z)$ is shown where the $(r, z)$ origin is along the central axis of the bearing 200. Thrust surfaces 288 and 290 are located at opposite ends of the bearing 200 and associated with the turbine side end piece 250 and the compressor side end piece 230, respectively. While this example includes thrust surfaces 288 at the turbine end and thrust surfaces 290 at the compressor end, a bearing may include thrust surfaces at a compressor end only or at a turbine end only. In the example of FIG. 2, the opening 220 is located centrally, however, in other examples, such an opening may be closer to the turbine end or closer to the compressor end. In yet other examples, an exemplary bearing may include multiple openings. As described herein, an exemplary bearing may rely on a type of locating mechanism that does not include a locating pin such as the pin 130; accordingly, such a bearing may not include an opening like the opening 220.

A bore 294 of the bearing 200 extends between the thrust surfaces 288, 290. The bore 294 may be disposed at various radii (e.g., dictated by end piece features and cylindrical piece features) and include an enhanced surface finish for bearing support of the unrelieved portions of the shaft at a compressor side inner journal surface and a turbine side inner journal surface, which, in the example of FIG. 1, are represented as surfaces 234 and 254 of respective end pieces 230 and 250.

As shown in FIG. 2, axial grooves 298 extend longitudinally along at least a portion of the end piece 230 for purposes of lubricant flow. The end piece 250 may include same or similar features. The axial grooves 298 can enhance rotordynamics by improving resistance to subsynchronous shaft motion through reduction of lubricant whirl encountered in lightly loaded bearing conditions. As described herein, such grooves may extend axially, radially, etc., and may vary in dimension, location and number. In arrangements where end pieces do not provide inner journal surfaces, another piece (e.g., a cylindrical piece) may include such inner journal surfaces and grooves or other features to provide for lubricant flow.

As shown in FIG. 2, the thrust surface 290 incorporates of plurality of radial grooves 295 which provide improved thrust capacity while enhancing contamination control. While FIG. 2 shows the thrust surface 290, the opposing thrust surface 288 may include same or similar features.

An exemplary bearing may include inner journal surface grooves that cooperate with features of a thrust surface. In the example of FIG. 2, the bearing 200 includes eight radial grooves at each end (about 45° spacing between adjacent radial grooves) where four of the grooves align with respective inner journal surface grooves (see, e.g., grooves 298). In the example of FIG. 2, at the compressor end, each of the axial grooves 298 has a V-shape while each of the radial grooves 295 has a somewhat U-shape. A relief 297 on the inner periphery of the thrust surface 290 can further enhance lubricant delivery and distribution.

As mentioned, an exemplary multi-piece bearing may include separate lubricant passages for a thrust surface and an inner journal surface. Hence, with reference to the example of FIG. 2, a bearing with separate lubricant passages may include an end piece with one or more openings that supply lubricant to a thrust surface.

FIG. 2 shows various dimensions for the bearing 200. The upper perspective view shows dimensions, $\Delta z_{CEC}$ as an axial distance of a portion of the end piece 230, $\Delta z_{CE}$ as an axial distance for a compressor end thrust section, $\Delta z_{CER}$ as an axial distance for a compressor end recessed section, $\Delta z_P$ as an axial distance for a pin receiving section, $\Delta z_{TER}$ as an axial distance for a turbine end recessed section, $\Delta z_{TE}$ as an axial distance for a turbine end thrust section and $\Delta z_{TEC}$ as an axial distance for a portion of the end piece 250.

The perspective view of FIG. 2 also shows dimensions $r_{CE}$ as a radial distance for an outer surface for a compressor end thrust section, $r_{CER}$ as a radial distance for an outer surface for a compressor end recessed section, $r_P$ as a radial distance for an outer surface for a pin receiving section, $r_{TER}$ as a radial distance for an outer surface for a turbine end recessed section, and $r_{TE}$ as a radial distance for an outer surface for a turbine end thrust section. While transitions from section to section appear as approximately 90° shoulders, other types of transitions may be used.

Figure 3:
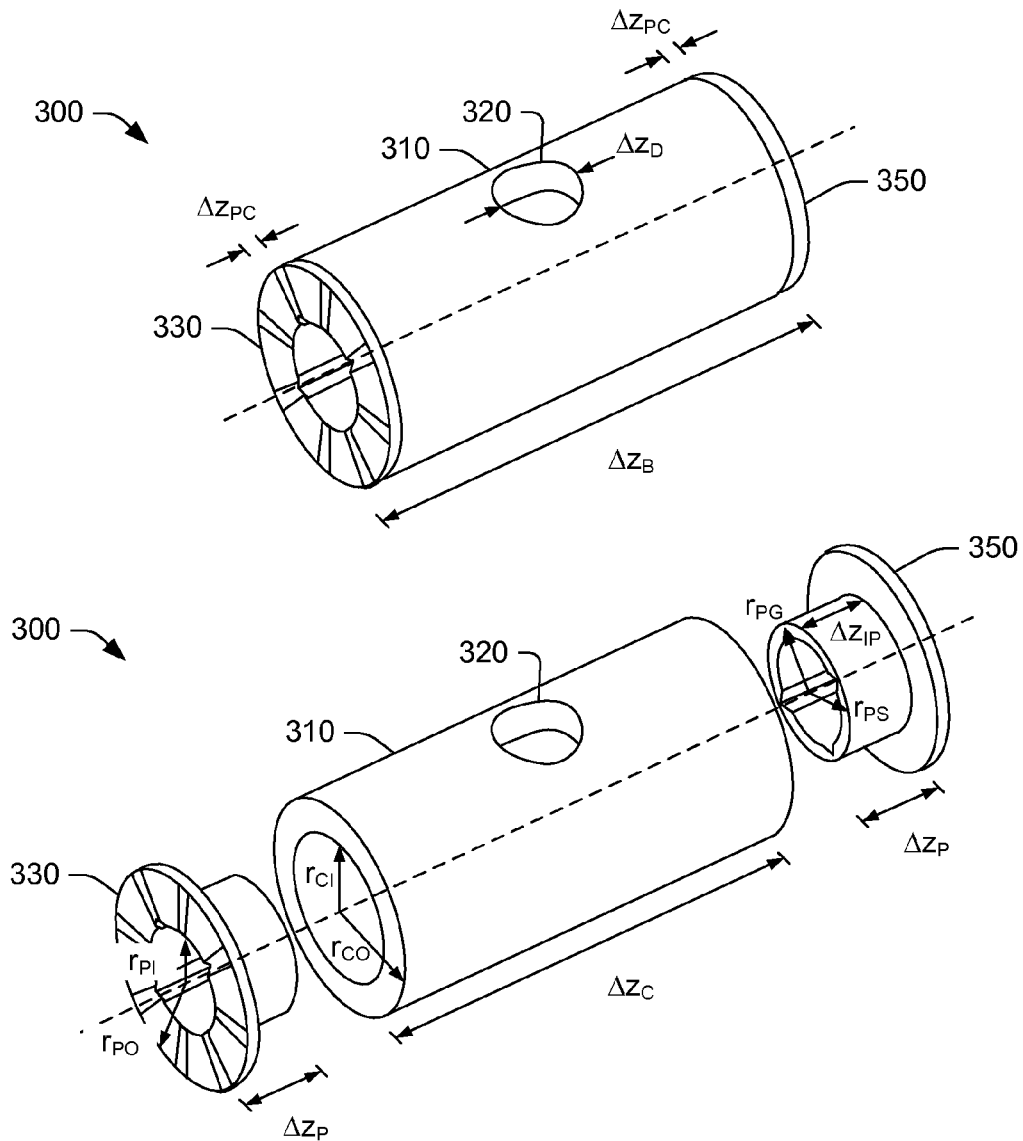
FIG. 3 is a perspective view and an exploded perspective view of an exemplary bearing.

FIG. 3 shows an assembled perspective view and an exploded perspective view of an exemplary multi-piece bearing 300 that includes a cylindrical piece 310, a compressor side end piece 330 and a turbine side end piece 350. In the example of FIG. 3, the cylindrical piece 310 may be symmetric about the opening 320 and the end pieces 330 and 350 may be identical and interchangeable (e.g., to fit either end of the cylindrical piece 310).

As shown in the assembled view, the bearing 300 has an overall bearing length $\Delta z_B$. The length $\Delta z_B$ is determined, at least in part, by the length $\Delta z_C$ of the cylindrical piece 310 and axial dimensions $\Delta z_{CP}$ of the end pieces as associated with a cap portion (CP). As shown in the exploded view, each of the end pieces 330, 350 has an axial length $\Delta z_P$ that includes the length of the cap portion $\Delta z_{CP}$ and an insert portion $\Delta z_{IP}$. As described herein, the cylindrical piece 310 receives the insert portions of the end pieces 330, 350. The manner of attachment may be press fit or other (e.g., brazing). Attachment of the end pieces 330, 350 may occur in a manner that provides for a desired overall length $\Delta z_B$ of the bearing 300 to determine one or more axial clearances. As described herein, where a bearing is located axially (e.g., by a central pin), attachment of end pieces may occur to determine a compressor side axial clearance and a turbine side axial clearance.

FIG. 3 also shows various radial dimensions including an outer radius $r_{CO}$ of the cylinder piece, an inner radius $r_{CI}$ of the cylinder piece 310, an outer radius $r_{PO}$ of an end piece, an inner radius $r_{PI}$ of an end piece, a groove depth radius $r_{PG}$ and a insert surface radius $r_{PS}$ of an end piece.

Figure 4:
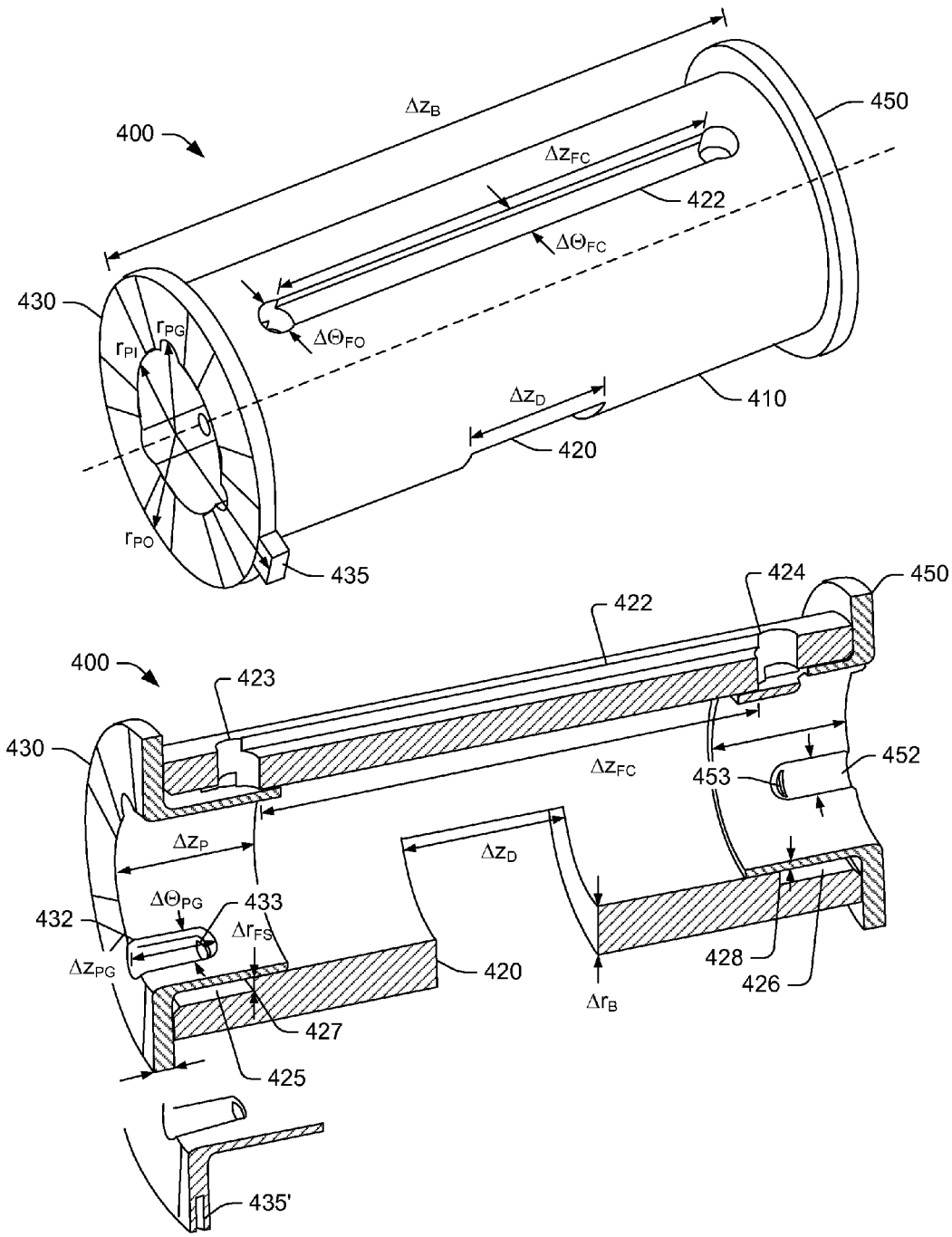
FIG. 4 is a perspective view and a cross-sectional view of an exemplary bearing.

FIG. 4 shows an exemplary multi-piece bearing 400 that includes a cylindrical piece 410 and end pieces 430, 450 where the end piece 430 further includes an anti-rotation feature 435. Accordingly, where the end piece 430 is attached to the cylindrical piece 410, the feature 435 may prevent or limit rotation of the bearing 400 in a bore of a housing. An alternative feature 435' is also shown as a receptacle, for example, configured to receive an anti-rotation component (e.g., a prong, a pin, etc.).

The exemplary bearing 400 of FIG. 4 also includes various lubricant passage features including an axial feed channel 422 defined by end ports 423, 424 that extend from an outer surface to an inner surface of the cylindrical piece 410. As shown, at the inner surface of the cylindrical piece 410, the end ports 423, 424 connect to respective lubricant reservoirs 425, 426, which are defined in part by a respective shoulder 427, 428. Specifically, the reservoir 425 is defined by the cylinder piece 410 and the end piece 430 while the reservoir 426 is defined by the cylinder piece 410 and the end piece 450. The reservoir 425 provides lubricant to an inner journal surface of the end piece 430 via three grooves (see, e.g., the groove 432) where each groove includes an opening (see, e.g., the opening 433) to the reservoir 425. The reservoir 426 provides lubricant to an inner journal surface of the end piece 450 via three grooves (see, e.g., the groove 452) where each groove includes an opening (see, e.g., the opening 453) to the reservoir 426. Lubricant that may flow axially inward may drain from the bearing 400 via an opening 420 in the cylindrical piece 410.

FIG. 4 further shows various dimensions not shown in the example of FIG. 3, including a feed channel length $\Delta z_{FC}$, a feed channel angular width $\Delta \Theta_{FC}$, end port angular width $\Delta \Theta_{FO}$, groove angular width $\Delta \Theta_{PG}$ and reservoir radial depth $\Delta r_{FS}$. As described herein, various dimensions may be the same for each end of a cylindrical piece or for each end piece or, alternatively, one or more dimensions may vary to account for requirements at a compressor side or requirements at a turbine side (noting that direction of insertion into a bore of a housing must then be accounted for during assembly).

Figure 5:
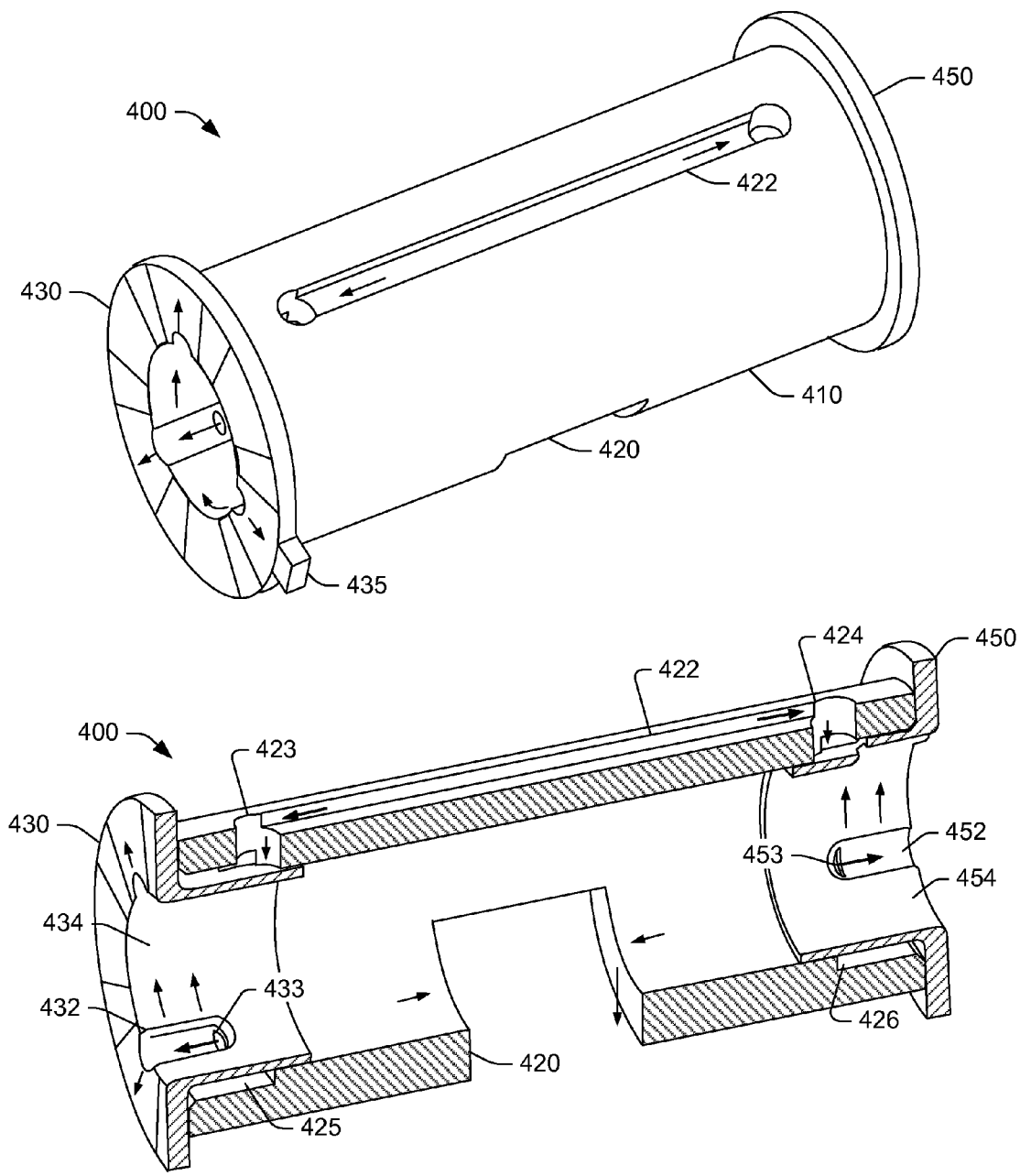
FIG. 5 is a perspective view and a cross-section view of the exemplary bearing of FIG. 4 that include some examples of lubricant flow paths.

FIG. 5 shows the exemplary bearing 400 of FIG. 4 along with various lubricant flow arrows to indicate direction of lubricant flow; noting that during operation some "backflow" may occur responsive to pressure differentials, etc. As indicated, the lubricant flows axially in the feed channel 422 to each of the end ports 423, 424. In turn, the end ports 423, 424 connect to the reservoirs 425, 426. The reservoir 425 provides lubricant to the inner journal surface 434 via, for example, the groove 432 and its corresponding opening 433. Further, the groove 432 provides lubricant to the thrust surface of the end piece 430. The reservoir 426 provides lubricant to the inner journal surface 454 via, for example, the groove 452 and its corresponding opening 453.

As described herein, an exemplary multi-piece bearing for a turbocharger can include a cylindrical piece with a coefficient of thermal expansion, opposing ends and an outer surface and an inner surface that extend between the opposing ends where the outer surface includes one or more lubricant openings; an end piece that has a different coefficient of thermal expansion, a face and an inner journal surface where the inner journal surface includes one or more lubricant grooves where each of the one or more grooves includes a respective lubricant opening; and lubricant passages formed by the cylindrical piece and the end piece for passage of lubricant between the one or more lubricant openings of the outer surface of the cylindrical piece and the one or more lubricant openings of the inner journal surface of the end piece.

As shown in the example of FIGS. 4 and 5, an exemplary bearing may include an end piece with an external diameter larger than the external diameter of a central piece (e.g., the cylindrical piece 410) where the larger diameter of the end piece acts to retain the bearing axially in a housing. As mentioned with respect to FIG. 4, one or both end pieces may include an anti-rotation feature such as the feature 435. While the feature 435 is configured for receipt by a receptacle (e.g., of a housing), an end piece may be configured with a receptacle for receipt of another piece. An exemplary arrangement may include a housing with a receptacle, an end piece with a receptacle and a bridge piece that is seated at least partially in both receptacles to prevent of a bearing in a housing (e.g., a pin that passes through an aperture of the housing for receipt by a receptacle in an end piece). Such arrangements may allow for a common or stock central piece (or cylindrical piece) and an end piece or pieces with features that provide for anti-rotation, axial retention or anti-rotation and axial retention.

Figure 6:
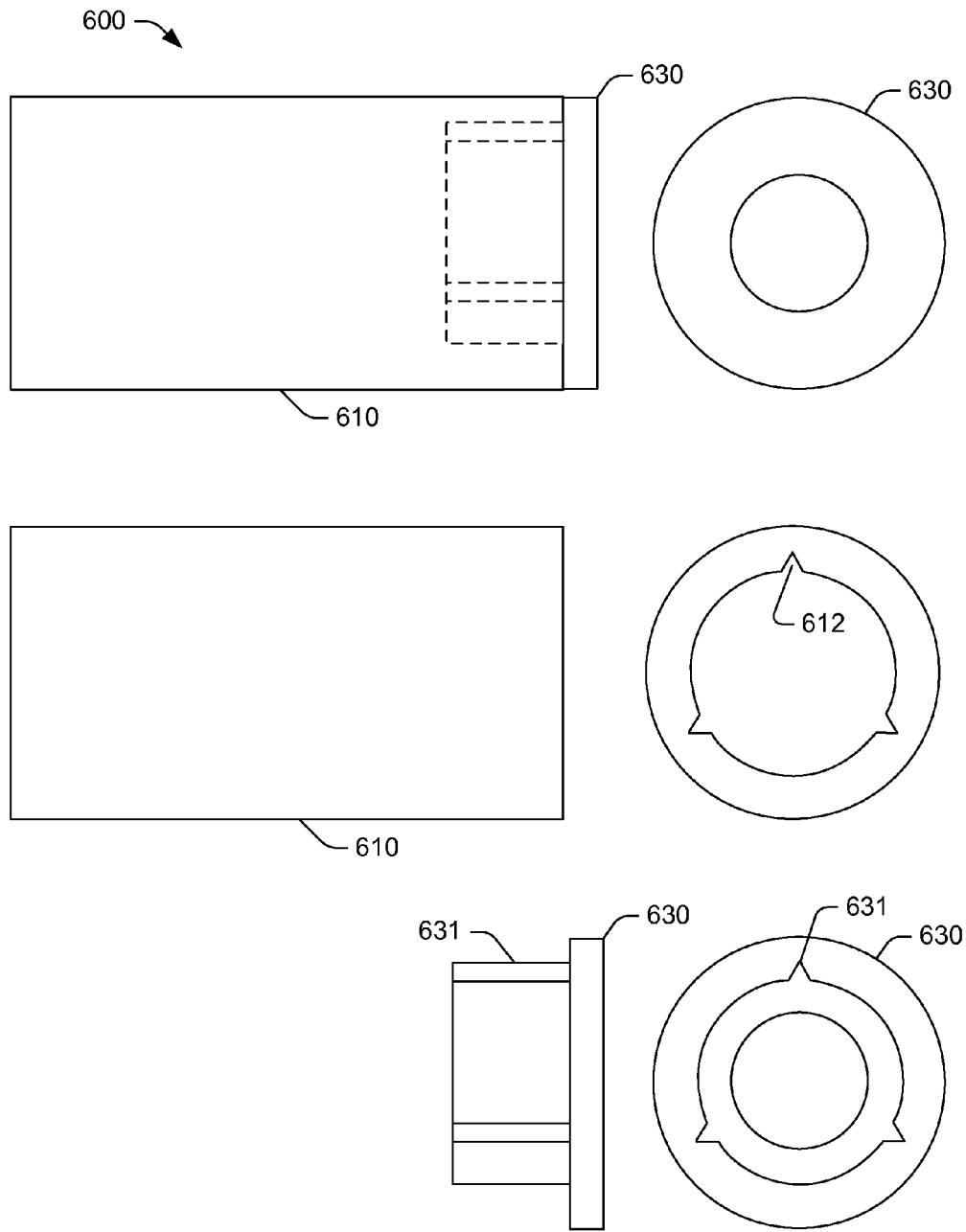
FIG. 6 is a series of views of an exemplary bearing.

FIG. 6 shows a series of side views of an exemplary bearing 600 as including a cylindrical piece 610 and an end piece 630. In the example of FIG. 6, the cylindrical piece 610 includes grooves 612 and the end piece 630 includes corresponding ridges 631 for receipt by the grooves 612. In such an arrangement, the end piece 630 is restricted from rotating with respect to the cylindrical piece 610.

Figure 7:
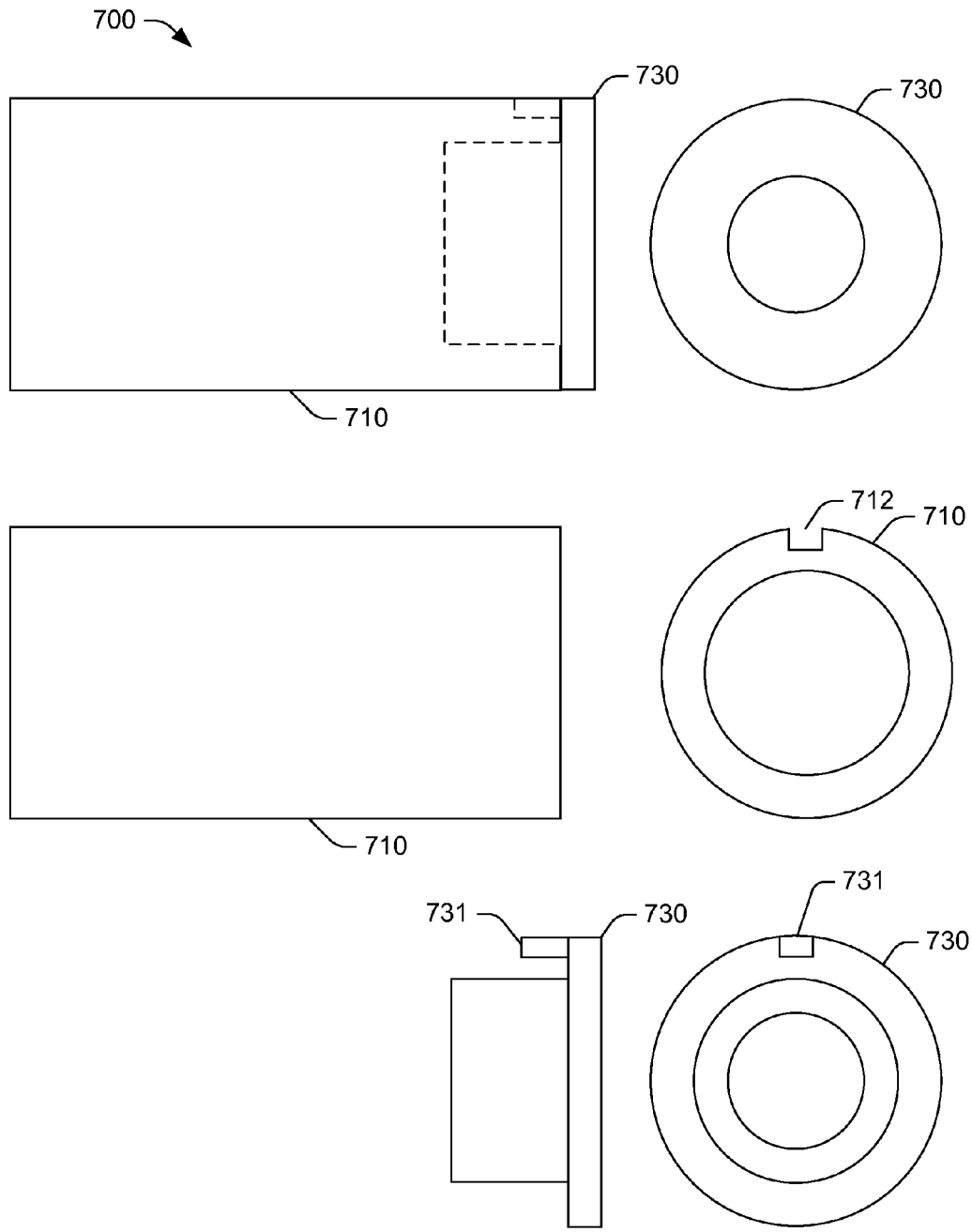
FIG. 7 is a series of views of an exemplary bearing.

FIG. 7 shows a series of side views of an exemplary bearing 700 as including a cylindrical piece 710 and an end piece 730. In the example of FIG. 7, the cylindrical piece 710 includes a notch 712 and the end piece 730 includes a corresponding tongue 731 for receipt by the notch 712. In such an arrangement, the end piece 730 is restricted from rotating with respect to the cylindrical piece 710.

Figure 8:
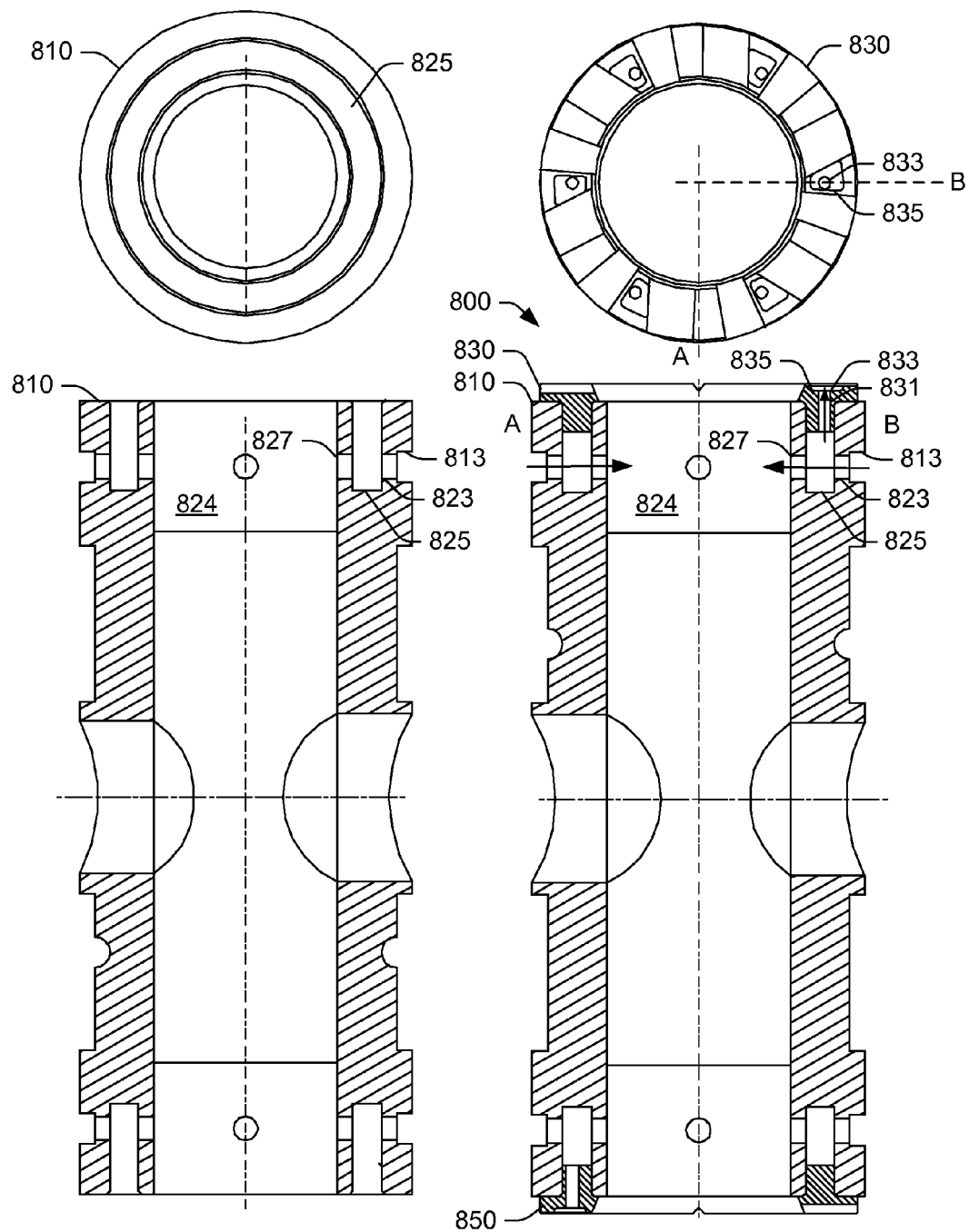
FIG. 8 is a series of end and cross-sectional views of an exemplary bearing.

FIG. 8 shows end and cross-sectional views of an exemplary bearing 800 that includes a cylindrical piece 810 and end pieces 830, 850. The cross-sectional view on the right hand side of FIG. 8 is along a section represented by line A and line B. The cylindrical piece 810 includes an annular channel 813 that connects to a radial bore 823, which connects to an annular reservoir 825 (e.g., circumferential reservoir) and to an opening 827 at an inner journal surface 824 of the cylindrical piece 810. The end piece 830 includes an axial bore 831 that has an opening 833 in an axial face of the end piece 830 at a recess 835. Accordingly, lubricant can flow from the outer surface of the cylindrical piece 810 to the reservoir 825 (via the bore 823) and to the recess 835 of the end piece 830 (via the bore 831 and opening 833) and to the opening 827 at the inner journal surface 824 of the cylindrical piece 810 (via the bore 823). Such an arrangement may be referred to as including separate thrust surface and journal surface lubricant passages, even though portions of the passages are common or shared.

As described herein, an exemplary multi-piece bearing for a turbocharger can include a cylindrical piece with a coefficient of thermal expansion, opposing ends and an outer surface and an inner surface that extend between the opposing ends where the outer surface includes one or more lubricant openings; an end piece with a different coefficient of thermal expansion and a face where the face includes one or more lubricant openings; and lubricant passages formed by the cylindrical piece and the end piece for passage of lubricant between the one or more lubricant openings of the outer surface of the cylindrical piece and the one or more lubricant openings of the face of the end piece.

Figure 9:
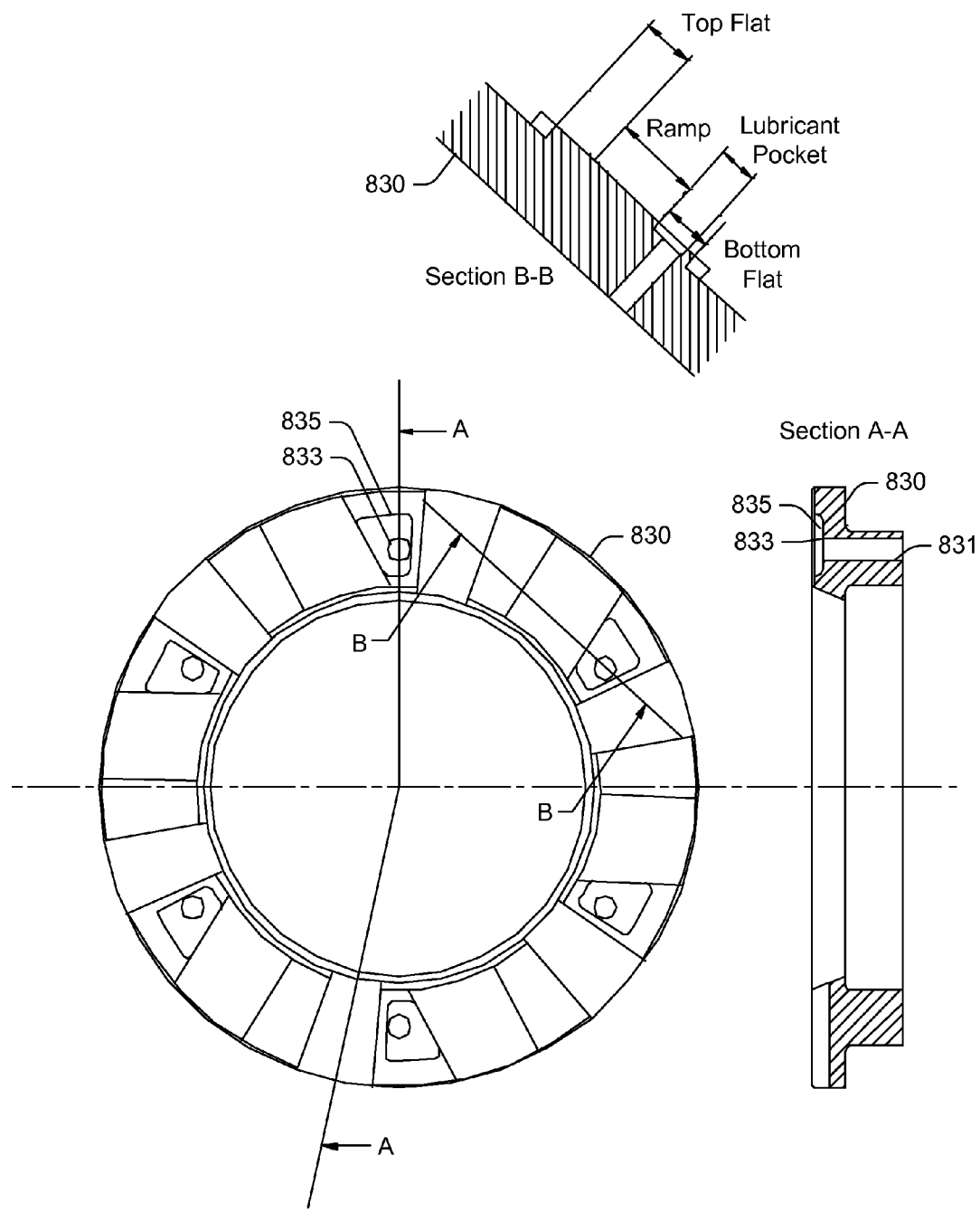
FIG. 9 is a series of views of an end piece of an exemplary bearing.

FIG. 9 shows a series of views of the end piece 830 of the exemplary bearing 800 of FIG. 8. FIG. 9 shows an end view of the piece 830 with a cross-section A-A along the line A-A and a cross-section B-B along the line B-B. The cross-section A-A shows the axial bore 831, the opening 833 and the recess 835. The cross-section B-B shows various features of the piece 830 including a top flat, a ramp, a lubricant pocket (e.g., a recess) and a bottom flat. For the example of FIGS. 8 and 9, lubricant emerging from the opening 833 of the axial bore 831 fills the recess 835. Lubricant in the recess 835 may be distributed to the bottom flat and, via the ramp, to the top flat. Accordingly, the end piece 830 has various lubricated surfaces that can contribute to thrust load capacity of a bearing.

Figure 10:
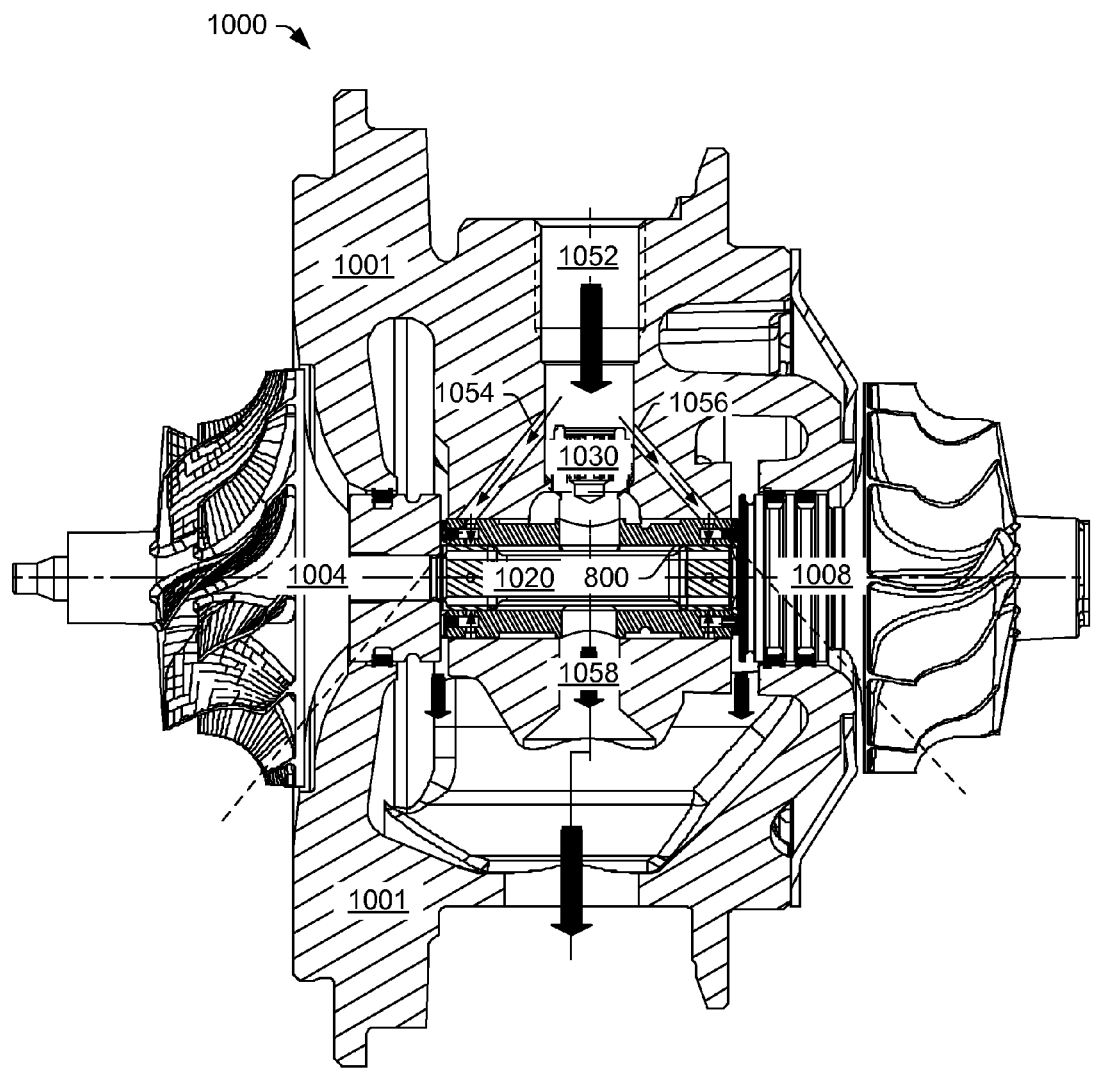
FIG. 10 is a cross-sectional view of an exemplary turbocharger assembly that includes the exemplary bearing of FIG. 8.

FIG. 10 shows a cross-sectional view of an exemplary turbocharger assembly 1000 that includes the exemplary bearing 800 of FIG. 8. The assembly 1000 includes a housing 1001 and has a compressor end 1004 and a turbine end 1008. The housing 1001 includes a lubricant passage 1052 that also provides for insertion of and securing of a component 1030 (e.g., a locating pin) of a locating mechanism. In the example of FIG. 10, the component 1030 seals an end of the passage such that lubricant flow is bifurcated to a compressor side passage 1054 and a turbine side passage 1056. The passages 1054, 1056 may be drilled into the housing from the compressor side 1004 and the turbine side 1008 of the housing 1001, respectively (see, e.g., dashed lines). Accordingly, lubricant flows from the passage 1052 to each end of the bearing 800 where it is distributed to a respective inner journal surface and a respective thrust surface; the latter via features of the end pieces 830, 850 of the bearing 800.

Figure 11:
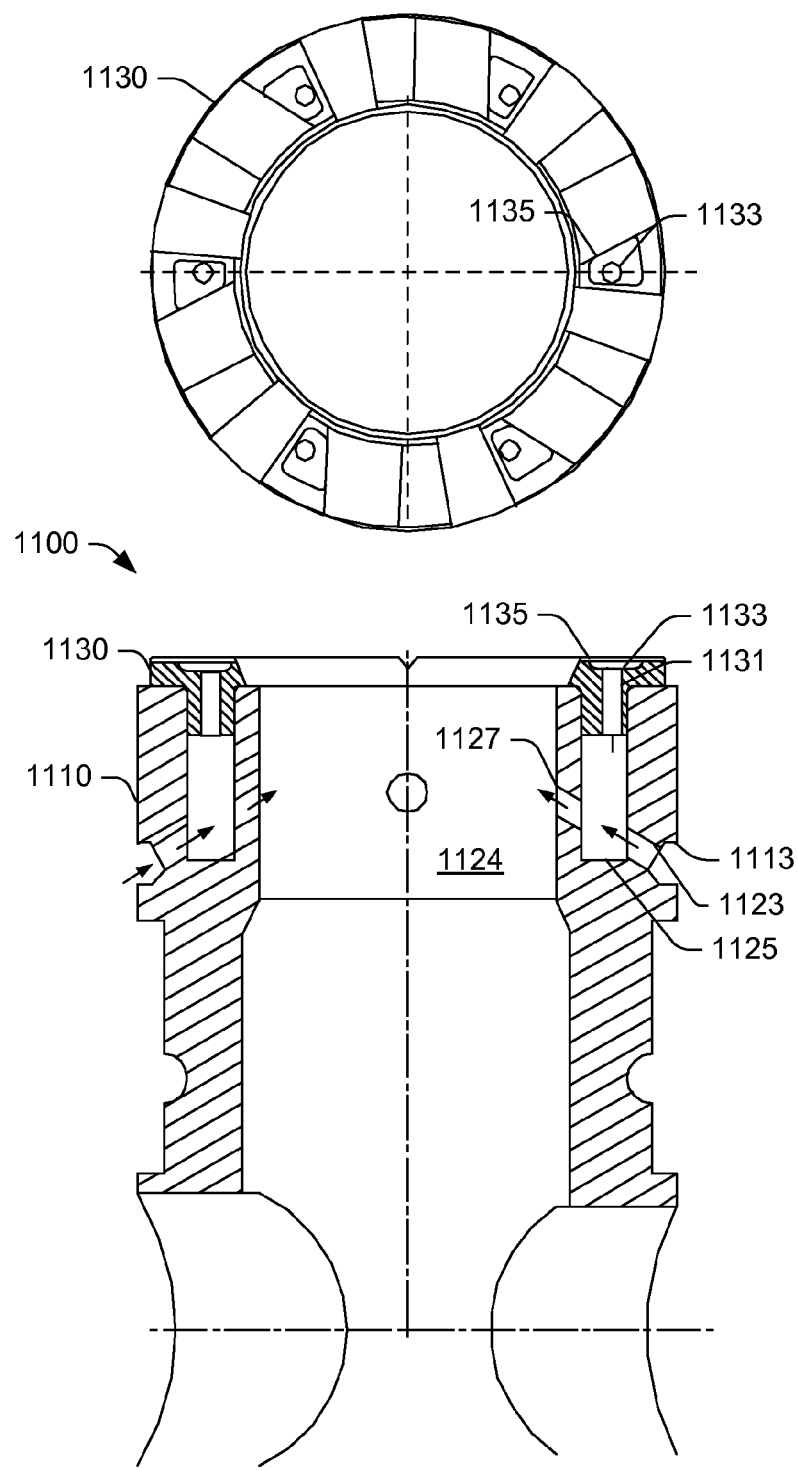
FIG. 11 is an end view and a cross-sectional view of an exemplary bearing.

FIG. 11 shows an end view and a cross-sectional view of an exemplary bearing 1100. The bearing 1100 includes at least one end piece 1130 attached to a cylindrical piece 1110. The cylindrical piece 1110 includes an annular channel 1113 that connects to a radial bore 1123, which connects to an annular reservoir 1125 (e.g., a circumferential reservoir) and to an opening 1127 at an inner journal surface 1124 of the cylindrical piece 1110. The end piece 1130 includes an axial bore 1131 that has an opening 1133 in an axial face of the end piece 1130 at a recess 1135. Accordingly, lubricant can flow from the outer surface of the cylindrical piece 1110 to the reservoir 1125 (via the bore 1123) and to the recess 1135 of the end piece 1130 (via the bore 1131 and opening 1133) and to the opening 1127 at the inner journal surface 1124 of the cylindrical piece 1110 (via the bore 1123). In the example of FIG. 11, the bore 1123 is disposed at an angle that is not orthogonal to the axis of the cylindrical piece 1110. In contrast, for the bearing 800, the bore 823 is substantially orthogonal to the axis of the cylindrical piece 810.

Figure 12:
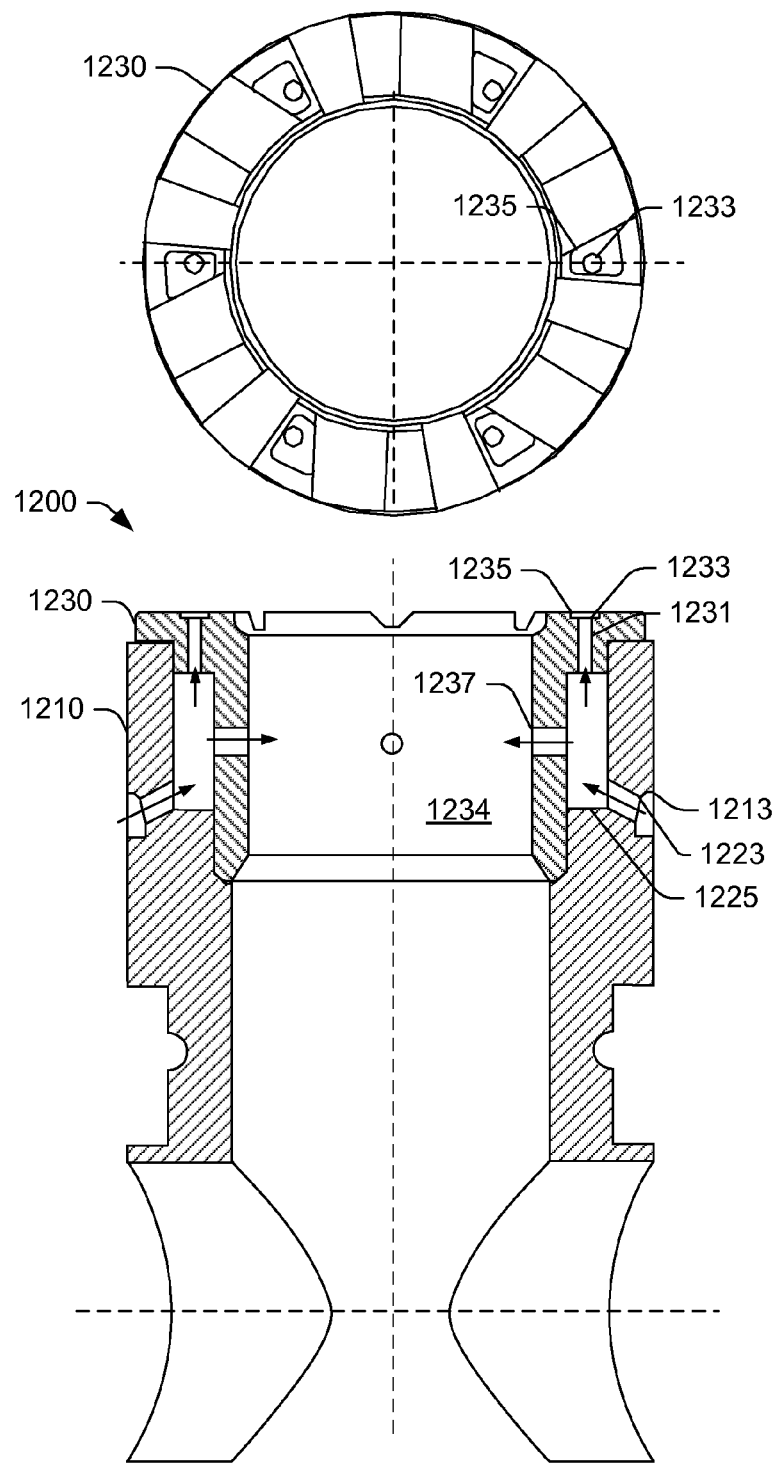
FIG. 12 is an end view and a cross-sectional view of an exemplary bearing.

FIG. 12 shows an end view and a cross-sectional view of an exemplary bearing 1200. The bearing 1200 includes at least one end piece 1230 attached to a cylindrical piece 1210. In the example of FIG. 12, the end piece 1230 includes an inner journal surface 1234 with several openings 1237 for flow of lubricant to (or from) the inner journal surface 1234 or associated lubricant film formed between the surface 1234 and a surface of a shaft disposed in the bearing 1200. The end piece 1230 also includes an axial bore 1231 that has an opening 1233 in an axial face of the end piece 1230 at a recess 1235.

The cylindrical piece 1210 includes an annular channel 1213 that connects to a radial bore 1223, which connects to an annular reservoir 1225, which is formed, in part, by the end piece 1230. Lubricant can flow from the reservoir 1225 to the end piece 1230 (e.g., via the opening 1233) and to the inner journal surface 1234 (e.g., via the opening 1237). In the example of FIG. 12, while the bore 1223 is disposed at an angle that is not orthogonal to the axis of the cylindrical piece 1210, in other examples, the bore 1223 may be orthogonal or at an angle other than the angle shown in FIG. 12.

Figure 13:
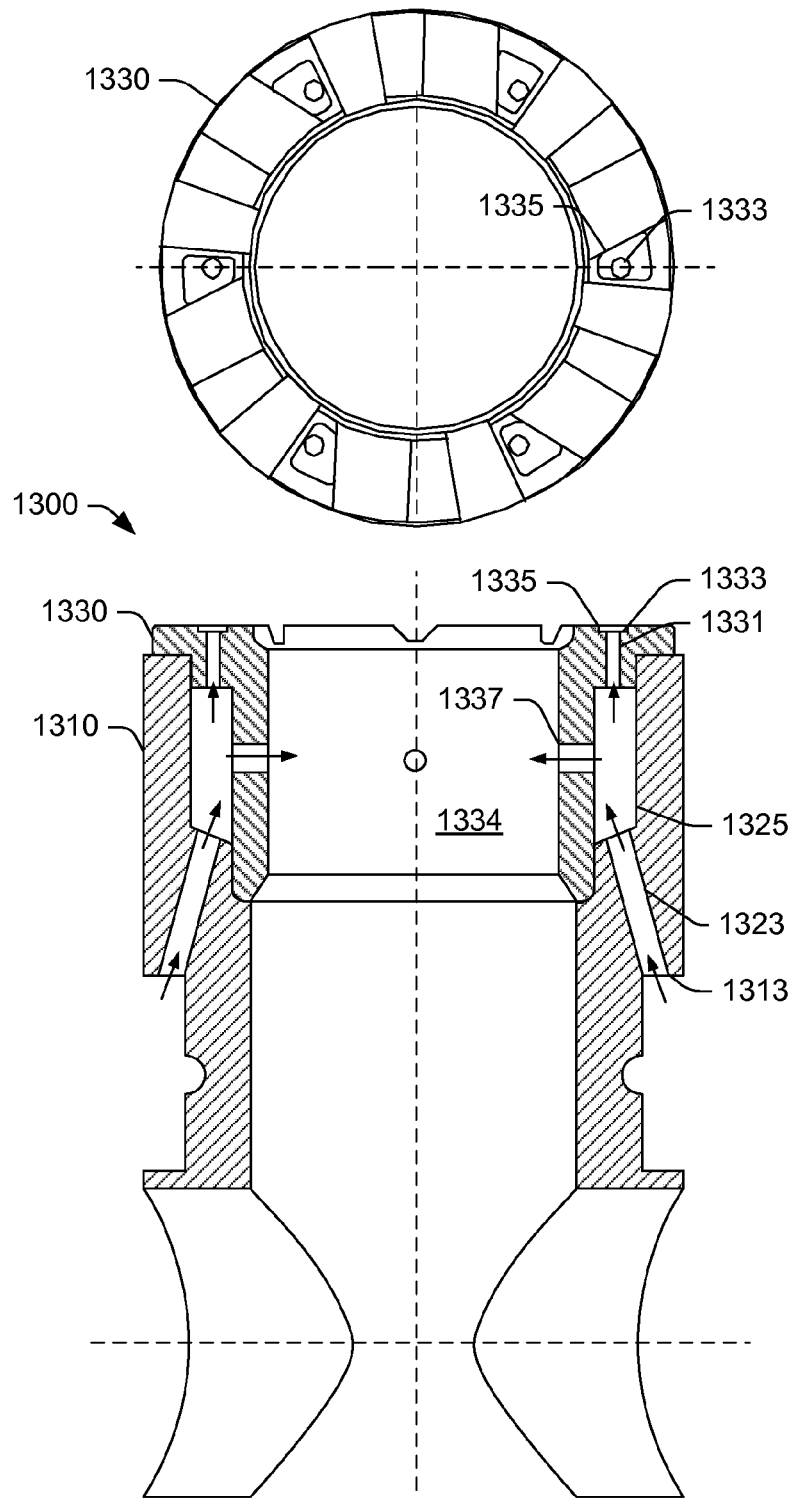
FIG. 13 is an end view and a cross-sectional view of an exemplary bearing.

FIG. 13 shows an end view and a cross-sectional view of an exemplary bearing 1300. The bearing 1300 includes at least one end piece 1330 attached to a cylindrical piece 1310. In the example of FIG. 13, the end piece 1330 includes an inner journal surface 1334 with several openings 1337 for flow of lubricant to (or from) the inner journal surface 1334 or associated lubricant film formed between the surface 1334 and a surface of a shaft disposed in the bearing 1300. The end piece 1330 also includes an axial bore 1331 that has an opening 1333 in an axial face of the end piece 1330 at a recess 1335.

The cylindrical piece 1310 includes an annular shoulder 1313 that connects to a bore 1323, which connects to an annular reservoir 1325, which is formed, in part, by the end piece 1330. Lubricant can flow from the reservoir 1325 to the end piece 1330 (e.g., via the opening 1333) and to the inner journal surface 1334 (e.g., via the opening 1337). In the example of FIG. 13, the bore 1323 is disposed at an angle from the shoulder 1313 to the reservoir 1325. Referring to the exemplary assembly 100 of FIG. 1, the housing 110 and the bearing 200 may include such a lubricant distribution system. For example, the bearing 200 may include a passage that allows lubricant to flow from the reservoir 114 to the inner journal surfaces 234, 254 of the end pieces 230, 250 to form lubricant films that lubricate the shaft surfaces 144, 148.

Figure 14:
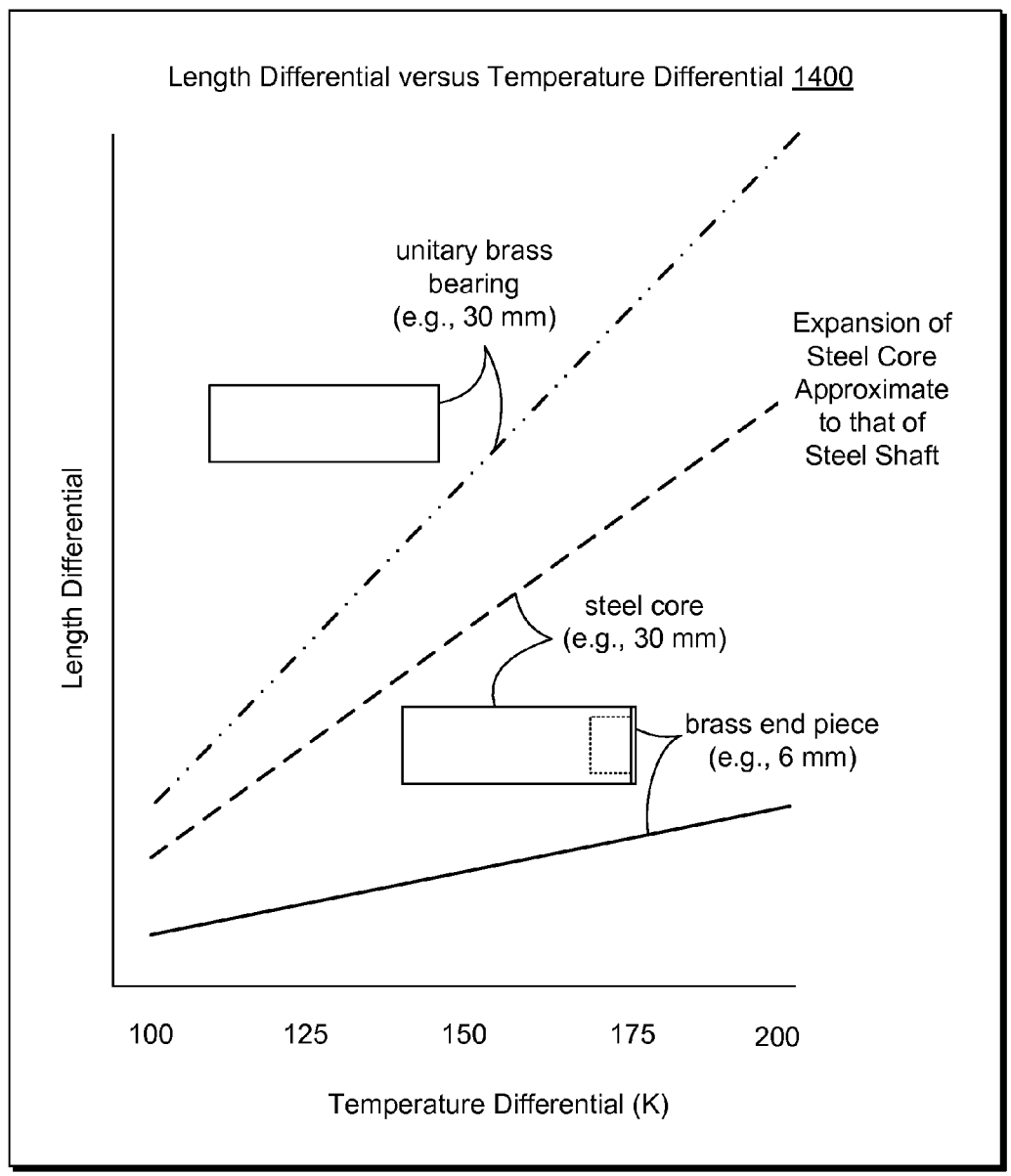
FIG. 14 is a plot of length differential versus temperature differential for two different materials.

FIG. 14 shows a plot 1400 of length differential versus temperature differential for a unitary brass bearing and an exemplary multi-piece bearing made from two different materials, specifically, the multi-piece bearing includes a steel core and a brass plug. The plot 1400 indicates how a brass bearing with a length of 30 mm, a steel core with a length of 30 mm and a brass end piece with a length of 6 mm expand over a temperature differential of 100 degrees. In such an example, part of the brass end piece may be received by a bore of the steel core thereby reducing the contribution of the brass end piece to the overall length of the bearing (e.g., only 1 mm or 2 mm may extend beyond an end of the steel core). The data of the plot 1400 indicates that, for a steel shaft, the length of the multi-piece bearing is determined primarily by the steel core. Accordingly, as temperature changes, expansion and contraction of the bearing will substantially match that of the shaft and act to maintain certain clearances compared to the unitary bearing made of brass.

As described herein, an exemplary method can include commencing operation of a turbocharger mounted to an internal combustion engine; and, during an increase in operational temperature, maintaining axial clearances between a multi-piece bearing and at least some other components of the turbocharger by expanding a cylindrical piece of the multi-piece bearing and expanding a turbocharger shaft supported by the multi-piece bearing where a coefficient of thermal expansion of the cylindrical piece substantially matches a coefficient of thermal expansion of the turbocharger shaft and where the multi-piece bearing includes at least one end piece with a coefficient of thermal expansion that differs from that of the cylindrical piece and that of the turbocharger shaft.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A multi-piece bearing for a turbocharger comprising:
a cylindrical piece that comprises a coefficient of thermal expansion, opposing ends and an outer surface and an inner surface that extend between the opposing ends wherein the outer surface comprises one or more lubricant openings;
an end piece that comprises a different coefficient of thermal expansion and a face wherein the face comprises one or more lubricant openings; and
lubricant passages formed by the cylindrical piece and the end piece for passage of lubricant between the one or more lubricant openings of the outer surface of the cylindrical piece and the one or more lubricant openings of the face of the end piece.

2. The multi-piece bearing of claim 1 wherein the end piece comprises an inner journal surface configured to support a turbocharger shaft.

3. The multi-piece bearing of claim 2 wherein the inner journal surface comprises one or more lubricant openings.

4. The multi-piece bearing of claim 3 comprising lubricant passages formed by the cylindrical piece and the end piece for passage of lubricant between the one or more lubricant openings of the outer surface of the cylindrical piece and the one or more lubricant openings of the inner journal surface of the end piece.

5. The multi-piece bearing of claim 1 further comprising a lubricant reservoir formed by the cylindrical piece and the end piece.

6. The multi-piece bearing of claim 5 wherein the lubricant reservoir comprises a circumferential reservoir.

7. The multi-piece bearing of claim 6 wherein the one or more openings of the outer surface of the cylindrical piece provide for lubricant passage to the lubricant reservoir.

8. The multi-piece bearing of claim 5 wherein the lubricant reservoir connects to the one or more openings of the face of the end piece and one or more openings of an inner journal surface configured to support a turbocharger shaft.

9. The multi-piece bearing of claim 1 wherein the outer surface comprises a shoulder and wherein the one or more openings of the outer surface of the cylindrical piece are disposed on the shoulder.

10. The multi-piece bearing of claim 1 further comprises a second end piece.

11. The multi-piece bearing of claim 10 wherein the second end piece comprises the same coefficient of thermal expansion as the first end piece.

12. The multi-piece bearing of claim 1 wherein, upon exposure to a positive temperature differential, at least 70% of the expanded length of the multi-piece bearing results from expansion of the cylindrical piece.

13. The multi-piece bearing of claim 1 wherein the end piece comprises a brass end piece.

14. The multi-piece bearing of claim 1 wherein the cylindrical piece comprises a steel cylindrical piece.

15. The multi-piece bearing of claim 1 wherein the end piece comprises an anti-rotation feature to limit rotation of the multi-piece bearing in a housing.

16. The multi-piece bearing of claim 1 wherein the end piece comprises a feature to axially retain the multi-piece bearing in a housing.

17. A method comprising:
commencing operation of a turbocharger mounted to an internal combustion engine; and
during an increase in operational temperature, maintaining axial clearances between a multi-piece bearing and at least some other components of the turbocharger by expanding a cylindrical piece of the multi-piece bearing and expanding a turbocharger shaft supported by the multi-piece bearing wherein a coefficient of thermal expansion of the cylindrical piece substantially matches a coefficient of thermal expansion of the turbocharger shaft and wherein the multi-piece bearing comprises at least one end piece with a coefficient of thermal expansion that differs from that of the cylindrical piece and that of the turbocharger shaft.

18. The method of claim 17 wherein the expanding a cylindrical piece comprises expanding steel and wherein the expanding the turbocharger shaft comprises expanding steel.

19. The method of claim 17 further comprising expanding at least one brass end piece.

20. A multi-piece bearing for a turbocharger comprising:
a cylindrical piece that comprises a coefficient of thermal expansion, opposing ends and an outer surface and an inner surface that extend between the opposing ends wherein the outer surface comprises one or more lubricant openings;

an end piece that comprises a different coefficient of thermal expansion, a face and an inner journal surface wherein the inner journal surface comprises one or more lubricant grooves wherein each of the one or more grooves comprises a respective lubricant opening; and
lubricant passages formed by the cylindrical piece and the end piece for passage of lubricant between the one or more lubricant openings of the outer surface of the cylindrical piece and the one or more lubricant openings of the inner journal surface of the end piece.

* * * * *